No. 769,008.

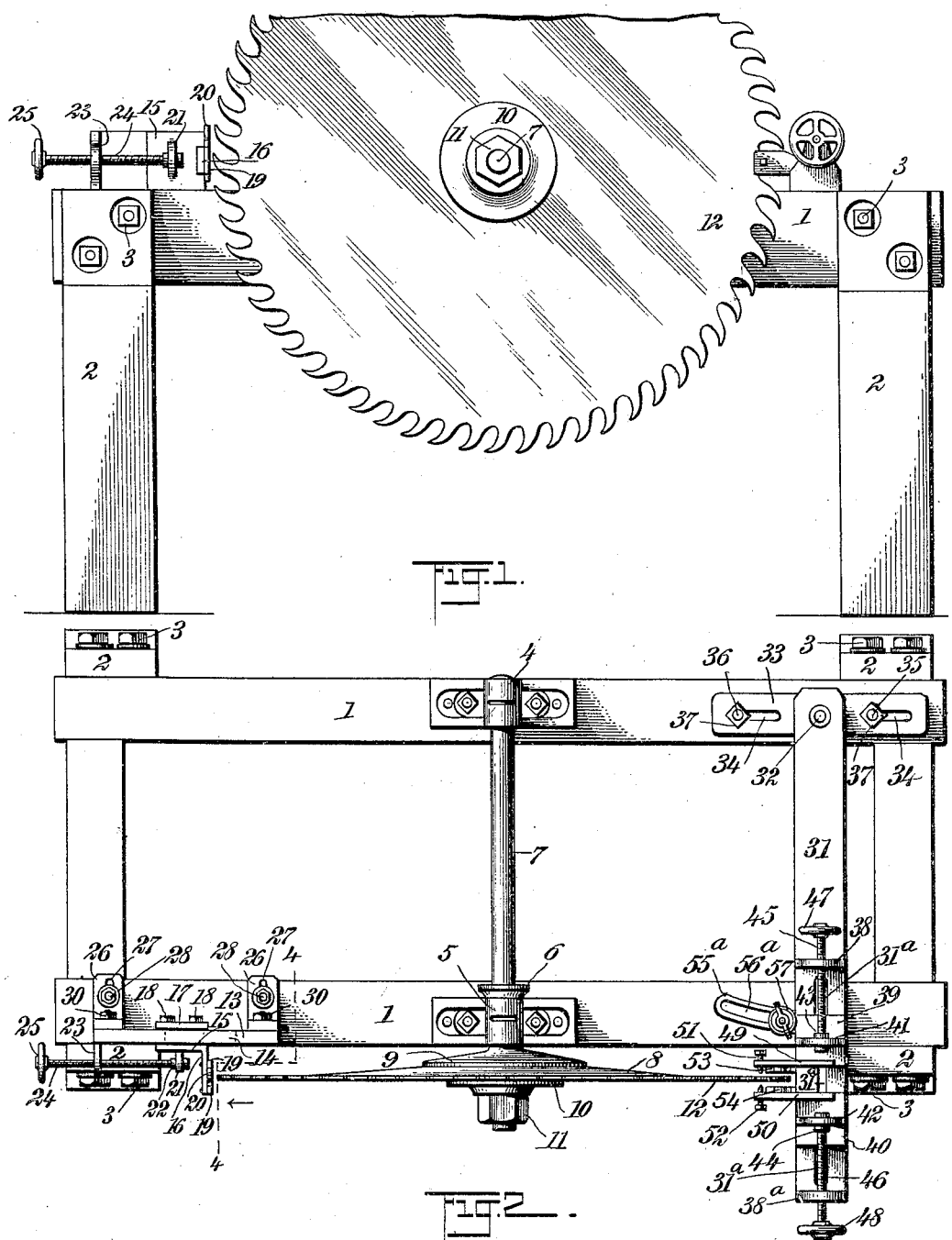

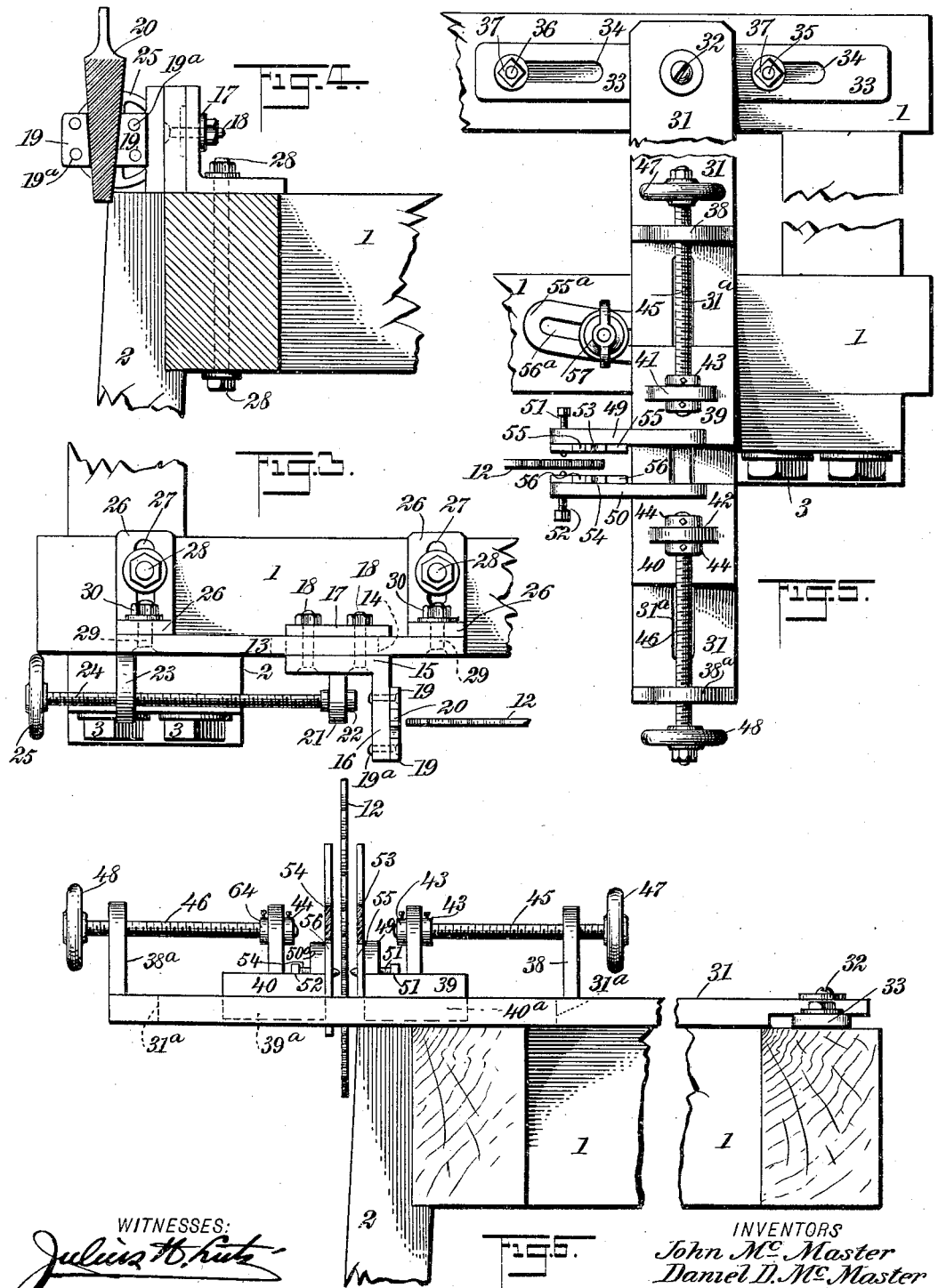

Patented August 30, 1904.

UNITED STATES PATENT OFFICE.

JOHN McMASTER AND DANIEL D. McMASTER, OF SEATTLE, WASHINGTON.

MACHINE FOR SHAPING SAW-TEETH.

SPECIFICATION forming part of Letters Patent No. 769,008, dated August 30, 1904.

Application filed January 8, 1903. Serial No. 138,283. (No model.)

*To all whom it may concern:*

Be it known that we, JOHN McMASTER and DANIEL D. McMASTER, both citizens of the United States, and residents of Seattle, in the county of King and State of Washington, have invented a new and Improved Machine for Shaping Saw-Teeth, of which the following is a full, clear, and exact description.

Our invention relates to a machine for shaping saw-teeth, and more particularly to a type of machine especially suitable for shaping the teeth of circular saws while in motion.

Reference is to be had to the accompanying drawings, forming a part of this specification, in which similar characters of reference indicate corresponding parts in all the figures.

Figure 1 is a side elevation of a machine embodying our invention. Fig. 2 is a plan view of the same. Fig. 3 is a fragmentary plan view of certain parts shown in the lower left-hand corner of Fig. 2. Fig. 4 is an enlarged section upon the line 4 4 of Fig. 2 looking in the direction of the arrow. Fig. 5 is a fragmentary plan view, likewise enlarged, and showing certain parts appearing at the right hand in Fig. 2; and Fig. 6 is a fragmentary side elevation, also enlarged, showing the machine as viewed from the right of Fig. 2.

The frame 1 is supported upon legs 2 2, which are secured thereto by means of bolts 3. Bearings 4 5 are mounted upon the frame 1 and support a revoluble shaft 7, provided with a collar 6, serving as a limiting-stop to prevent longitudinal movement of the shaft.
Flattened disks 8 9 are rigidly connected with the shaft 7 and are revoluble therewith for the purpose of supporting a saw 12, which is rigidly secured in place by the pressure of a nut 11. This nut may be taken off for the purpose of removing the saw 12.

A plate 13 is adjustably mounted upon the frame 1 and is provided with a slot 14. (Shown by dotted lines in Figs. 2 and 3.) A slidable plate 15, provided with an integral jaw 16 and constituting a movable bracket, is mounted upon the plate 13 by means of bolts 18, which engage another movable plate, 17, the arrangement being such that the bracket may be moved longitudinally in the general length of the plate 13 and tightened at any desired point by the bolts 18. Mounted upon the jaw 16 of the bracket are lugs 19, having, preferably, the shape indicated in Fig. 4 and held in position by means of bolts $19^a$. These lugs are provided for the purpose of supporting a file 20, as indicated more particularly in Fig. 4. Mounted rigidly upon the bracket is an ear 21, engaged by set-collars 22. An ear 23 is rigidly mounted upon the plate 13 and supports a screw 24, provided with a revoluble handle 25. The set-collars 22 are mounted upon the end of this screw, as indicated in Fig. 3. A pair of adjusting-brackets 26 are each provided with a central slot 27, engaged by a bolt 28, as indicated more particularly in Fig. 3. This arrangement enables the brackets 26 to be moved laterally or at right angles with the general plane of the saw 12, thereby moving the plate 13 and the ear 23. By this arrangement the file 20 may be adjusted so that the angle formed by its face and the saw 12 may be corrected. The file should preferably be at a right angle to the saw, as indicated in Fig. 3. Bolts 29 and nuts 30 serve to hold the brackets 26 against the plate 13, as indicated in Fig. 3. Upon the opposite end of the frame a lever 31 is journaled at 32 upon a plate 33, provided with slots 34, these slots engaging bolts 35 36, provided with nuts 37, whereby the plate 33 is rendered adjustable relatively to the frame 1, as indicated more particularly in Fig. 5. The lever 31 is provided with a longitudinal slot $31^a$ for the purpose of acting as a guide for certain parts, as hereinafter described. Rigidly mounted upon the lever 31 are ears 38 $38^a$. Slidably mounted upon the lever 31 are levers 39 40, provided, respectively, with ears 41 42, as shown more particularly in Fig. 5. These levers 39 40 are provided, respectively, with tongues $39^a$ $40^a$, which project downwardly into the slot $31^a$, as indicated in Fig. 6.

Set-collars 43 44 are mounted upon the ends of screw members 45 46, these screw members being provided with hand-wheels 47 48. By turning the hand-wheels the screw members 45 46 are caused to actuate the sliding levers 39 40. These levers are provided with integral ears 49 50, which are engaged by screw-bolts 51 and 52. These screw-bolts are for the purpose of guiding the saw 12, as indicated more particularly in Fig. 5. By adjusting the screw-bolts by hand the saw 12 may be maintained in its proper central position or it may be forced slightly to the right or to the left, as desired. Files 53 54, similar to that already mentioned, are supported by lugs 55 56 in the manner above described. (See Fig. 6.) It will be observed, therefore, that the ears 49 50 and the lugs 55 56 together constitute brackets for supporting the files 53 54.

An arm $55^a$ is provided with an arc-shaped slot $56^a$, this arm being engaged by a thumb-nut 57, whereby the plate 31 may be moved upon the journal 32 as an axis. By taking off the nut 11 and removing the saw 12 the plate 31 may be swung inward or toward the shaft 7 a slight distance, which is permitted by the slot $56^a$. On loosening the thumb-nut 57 the lever 31 can be swung away from the saw 12. By this means saws of larger or smaller diameter may be substituted and the plate 31 brought into proper position relatively thereto.

It will be noted that our invention permits of quite a number of adjustments. By actuating the hand-wheels 47 48 the files 53 54 may be brought into contact with the saw 12 and may be caused to press upon the same to any desired extent. By adjusting the screw-bolts 51 52 the saw may be adjusted and guided somewhat independently of the files. By means of the thumb-nut 57 the lever 31 may be adjusted radially upon the journal 32, and by means of the bolts 37 the plate 33 may be adjusted regardless of other parts. By means of the members 26 the file 20 may be adjusted relatively to the lateral position of the saw. By means of the bolts 18 the file 20 may be adjusted directly toward and from the saw. The hand-wheel 25 enables the adjustment of the file directly toward and from the saw. The bolts 18 are used more particularly when it is desired to remove a saw of one size and substitute therefor a saw of another size.

By running the saw with the files adjusted as above described the saw-teeth are rendered uniform in length and thickness. The operation may readily be performed after the teeth have been swaged for sharpening.

Having thus described our invention, we claim as new and desire to secure by Letters Patent—

1. A machine for shaping saw-teeth, comprising mechanism for mounting a toothed saw so that the same is free to move, a frame for supporting said mechanism, a lever pivoted upon said frame and normally free to swing relatively to said saw, means, controllable at will, for securing said lever in different positions relatively to said saw, and brackets mounted upon said lever and normally located adjacent to said saw for supporting files against the same.

2. A machine for shaping saw-teeth, comprising mechanism for mounting a toothed saw so that the same is free to move, a frame for supporting said mechanism, a lever pivotally connected with said frame and normally free to swing relatively to said saw, means, controllable at will, for securing said lever in different positions relatively to said saw, brackets mounted upon said lever and normally located adjacent to the path of said saw, and means, controllable at will, for adjusting said brackets relatively to the edge of said saw.

3. A machine for shaping saw-teeth, comprising mechanism for mounting a toothed saw so that the same is free to move, a frame for supporting said mechanism, a lever pivotally connected with said frame and normally free to swing relatively to said saw, means, controllable at will, for securing said lever in different positions relatively to said saw, brackets mounted upon said lever and normally located adjacent to the path of said saw, and independent screw mechanisms connected with said brackets respectively, and controllable at will, for adjusting said brackets relatively to the edge of said saw and independently of each other.

4. A machine for shaping saw-teeth, comprising mechanism for mounting a toothed saw so that the same is free to move, a frame for supporting said mechanism and said saw, a plate mounted upon said frame, means, controllable at will, for adjusting said plate relatively to said frame, a lever journaled upon said plate and normally free to swing, and brackets slidably mounted upon said lever and disposed one upon each side of the path of said saw, said brackets being adapted to support files.

5. A machine for shaping saw-teeth, comprising mechanism for mounting a toothed saw so that the same is free to move, a frame for supporting said mechanism and said saw, a plate mounted upon said frame, means, controllable at will, for adjusting said plate relatively to said frame, a lever journaled upon said plate and normally free to swing, brackets mounted upon said lever and disposed one upon either side of the path of said saw, said brackets being adapted to support files, and means, controllable at will, for adjusting said brackets relatively to the path of said saw.

6. A machine for shaping saw-teeth, comprising mechanism for mounting a toothed saw so that the same is free to move, a frame for supporting said mechanism and said saw, a plate mounted upon said frame, means, controllable at will, for adjusting said plate relatively to said frame, a lever journaled upon said plate and normally free to swing relatively thereto, brackets slidably mounted upon said lever and disposed one upon either side of the path of said saw, said brackets being adapted to support files, and screw mechanism adjustable at will for guiding said saw relatively to said files.

7. In a machine for shaping saw-teeth, the combination of a frame for supporting a revoluble saw, a plate adjusted relatively thereto in the general direction of the plane thereof, a lever connected with said plate and free to swing relatively thereto, members mounted upon said lever and adapted to carry files, and mechanism controllable at will for moving said members relatively to said lever.

In testimony whereof we have signed our names to this specification in the presence of two subscribing witnesses.

JOHN McMASTER.
DANIEL D. McMASTER.

Witnesses:
  WINFIELD R. SMITH,
  J. W. GRAHAM.